United States Patent [19]

Kikuchi

[11] Patent Number: 5,327,483
[45] Date of Patent: Jul. 5, 1994

[54] CORDLESS PHONE AND CORDLESS PHONE SYSTEM USING SUCH CORDLESS PHONE

[75] Inventor: Tetuya Kikuchi, Kawasaki, Japan

[73] Assignee: Fujitsu Limited, Kawasaki, Japan

[21] Appl. No.: 954,667

[22] Filed: Sep. 30, 1992

[51] Int. Cl.⁵ .................... H04M 11/00; H04Q 7/00
[52] U.S. Cl. ...................................... 379/61; 379/58; 455/33.2
[58] Field of Search ................ 379/58, 59, 60, 61, 379/102; 455/33.1, 33.2

[56] References Cited

U.S. PATENT DOCUMENTS

| | | | |
|---|---|---|---|
| 4,903,257 | 2/1990 | Takeda et al. | 370/109 |
| 4,912,705 | 3/1990 | Paneth et al. | 370/109 |
| 4,955,050 | 9/1990 | Yamauchi | 379/59 |
| 4,972,506 | 11/1990 | Uddenfeldt | 379/59 |
| 5,036,533 | 7/1991 | Carter et al. | 379/63 |
| 5,133,001 | 7/1992 | Bohm | 379/58 |

Primary Examiner—Stephen Chin
Assistant Examiner—Vijay Shankar

[57] ABSTRACT

A cordless phone includes a base station coupled to a local line and a personal station communicating with the base station by radio. The base station includes a first channel unit for operatively coupling the personal station to the line so that communication between the personal station and an external station connected to the local line is carried out via the local line and the base station. A second channel unit is provided in the phone for operatively coupling the personal station to a digital highway through which digital data is transmitted so that extension communication between the personal station and an internal station, such as electric equipment, connected to the digital highway, is carried out via the digital highway and the base station. The cordless phone further has a switching circuit for selectively activating either one of the first or second channel units, based on control information supplied from the local line, the personal station or the digital highway.

17 Claims, 9 Drawing Sheets

CORDLESS PHONE AND CORDLESS PHONE SYSTEM USING SUCH CORDLESS PHONE

BACKGROUND OF THE INVENTION (1) Field of the invention

The present invention generally relates to a cordless phone and a cordless phone system using such cordless phone, and more particularly to a cordless phone and a cordless phone system in which an extension communication between cordless phones and control of domestic electric equipments can be performed.

(2) Description of related art

Recently, demand for cordless phones has been rapidly grown because of the convenience thereof. There is a case where many cordless phones are used in a large office. In addition, a cordless phone system has been also proposed in which a plurality of cordless phones are connected to a PBX so that an extension communication between the cordless phones, general calling to the cordless phones, a paging operation, calls to other stations via an outside line, data transmission and so on can be performed. There is a desire for simple and high performance cordless phone systems to be used in small offices and homes.

Figure 1:
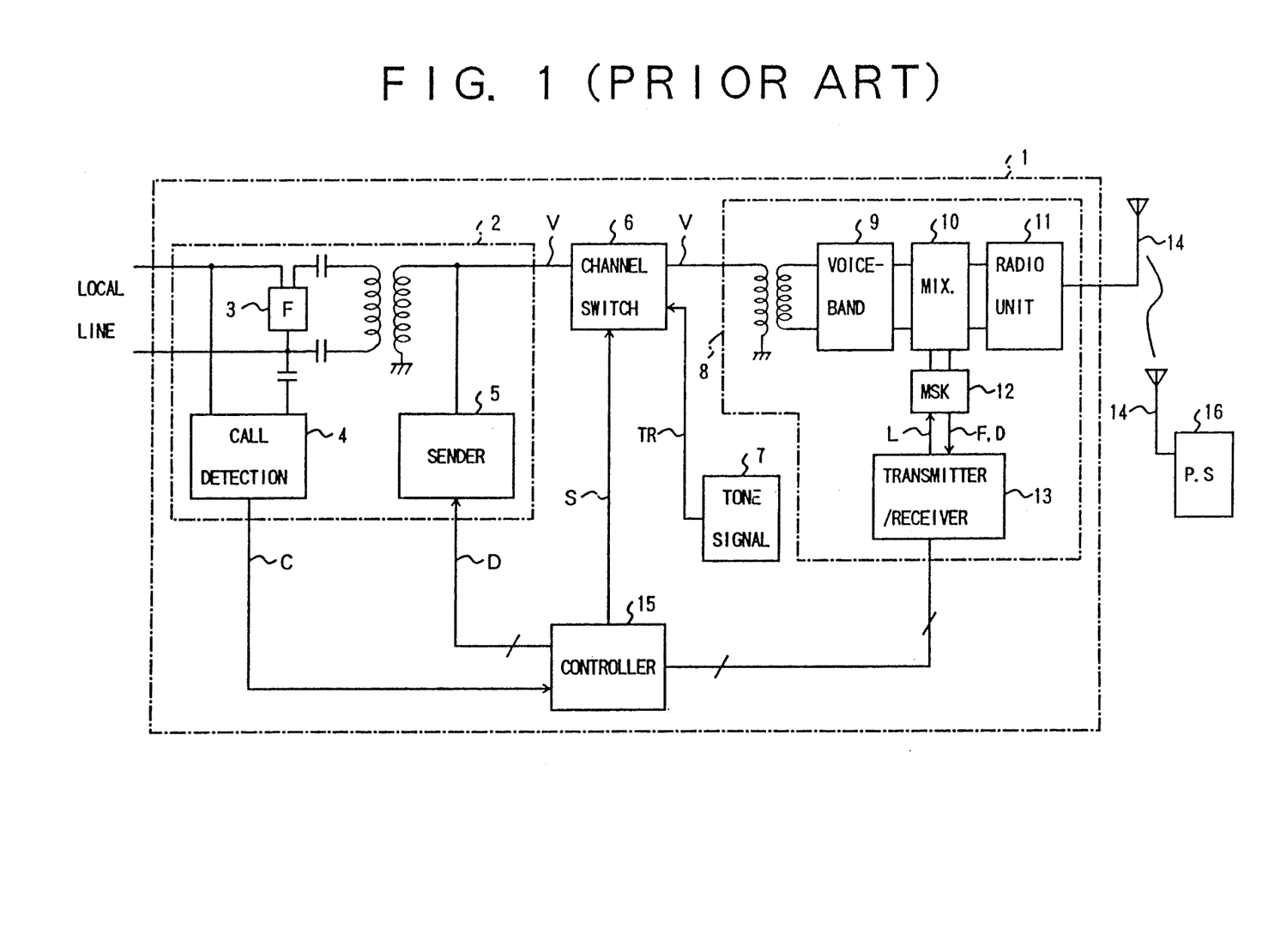
FIG. 1 is a block diagram illustrating a conventional cordless phone.

FIG. 1 shows a conventional cordless phone. Referring to FIG. 1, a cordless phone is constituted of a base station 1 and a personal station 16. The base station 1 has a local line interface 2, a personal station interface 8, a channel switch 6, a tone signal source 7 generating tone signals such as a ringing tone signal (RT), and controller 15. The channel switch 6 selectively makes a channel between the local line interface 2 and the personal station interface 8 and a channel between the tone signal source 7 and the personal station interface 8. The local line interface 2 is connected to a local line and has a hook circuit 3 (F) performing an open/close control of a loop, a call detecting circuit 4 for detecting a calling signal and a sender 5 sending dialing signals (push-button signals). The personal station interface 8 has a voice-band processing circuit 9, a mixer 10, a radio unit 11 including a control channel and a voice channel, an MSK modem 12 and a data transmitter-receiver 13 connected to an antenna 14. The MSK modem 12 converts 1/0 digital signals respectively into 1200/1800 Hz analog signals and vice versa. The controller 15 controls the local interface 2, the channel switch 6 and the personal station interface 8.

When a calling signal transmitted via the local line is received by the base station 1, a detecting signal C output from the call detecting circuit 4 is supplied to the controller 15. The controller 15 supplies the lamp signal L and a switching signal S respectively to the personal station interface 8 and the channel switch 6. Due to the switching signal S, the channel switch 6 makes a channel connecting the tone signal source 7 to the personal station interface 8 so that the tone ringer signal (TR) is supplied to the personal station interface 8. The lamp signal L is converted into an analog signal by the MSK modem 12 and supplied to the radio unit 11 via the mixer 10. Then the lamp signal L is transmitted from the control channel of the radio unit 11 to the personal station 16. As a result, a calling lamp of the personal station 16 is turned on. A frequency band of the tone ringer signal (TR) is limited to a predetermined band by the voice-band processing circuit 9, and mixed with an MKS signal by the mixer 10. A signal corresponding to the tone ringer signal (TR) is supplied from the mixer 10 to the radio unit 11, and transmitted via the voice channel of the radio unit 11 to the personal station 16. As a result, a tone ringer is made to ring in the personal station 16. At this time, when an off-hook operation of the personal station 16 occurs, an off-hook signal F is supplied to the controller 15 via the data transmitter/receiver 13. The controller 15 causes the hook circuit 3 to be in an off-hook state and supplies a switching signal to the channel switch 6. The channel switch 6 makes a channel between the local line interface 2 and the personal station interface 8, so that communication between the personal station 16 and calling station can be performed via the base station 1.

In a case where the personal station 16 calls another station, first, an off-hook operation of the personal station is carried out. The off-hook signal depending on the off-hook operation F is transmitted from the personal station 16 to the base station 1 by radio and supplied to the controller 15 via the data transmitter/receiver 13. The controller 15 causes the hook circuit 3 to be in the off-hook state and supplies a switching signal S to the channel switch so that the channel between the local line interface 2 and the personal station interface 8 is formed. Under this condition, an operator of the personal station 16 recognizes a dial tone and carries out a dialling operation. Dial data D depending on the dialling operation in the personal station 16 is supplied to the controller 15 via the data transmitter/receiver 13. The controller 15 supplies the dial data D to the sender 5 and the sender 5 supplies a dialling signal corresponding to the dial data D to the local line.

The above conventional cordless phone can carry out communication with an external station via an outside line (the local line). However, in a system having a plurality of the above conventional cordless telephones, extension communication between the cordless telephones cannot be performed. If the base station 1 is constituted so that a plurality of personal stations 16 are coupled thereto, extension communication between personal stations 16 can be performed via the base station 1. However, in this case, the number of channels which can be provided in the base station 1 and an area where radio communication between personal stations and the base station 1 can be performed are limited, and the cost thereof increases.

Figure 2:
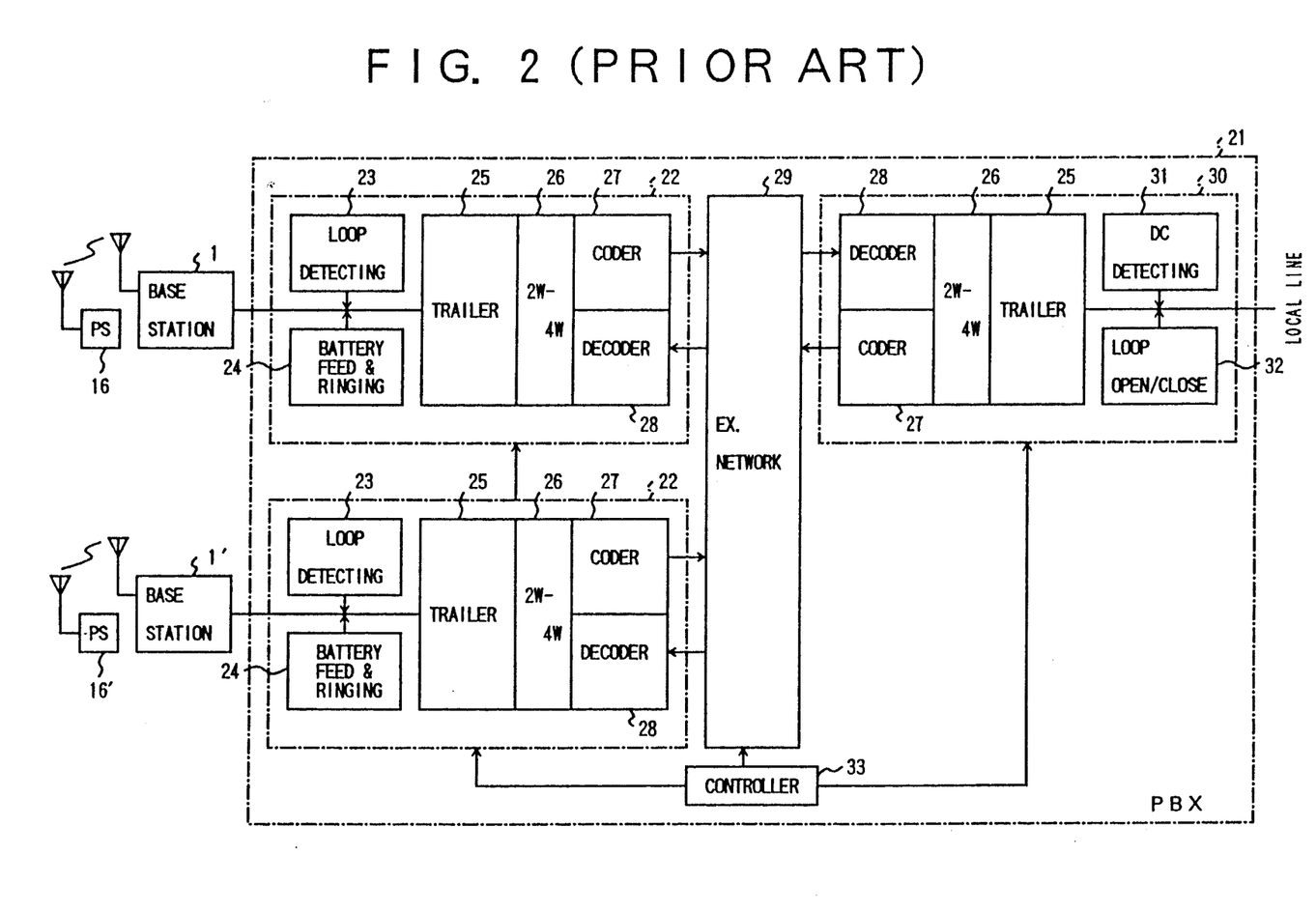
FIG. 2 is a block diagram illustrating a conventional telephone exchange system using a PBX.

FIG. 2 shows a conventional telephone exchange system using a PBX. Referring to FIG. 2, two cordless phones are connected to a PBX 21. The cordless phones are constituted of base stations 1 and 1' and personal stations 16 and 16'. The PBX 21 has line circuits 22 connected to the base stations 1 and 1' of the cordless phones, a digital exchange network 29, a trunk circuit 30 and a controller 33. Each of the line circuits 22 accommodates a 2W subscriber line connected to the base station 1 (1') of a corresponding cordless phone. Each of the line circuits 22 has a loop detecting circuit 23, a battery feed and ringing circuit 24, a terminating circuit 25 of the subscriber line, a 2-to-4 wire converter 26, a coder 27 and a decoder 28. The trunk circuit 30 has a DC detecting circuit 31 and a loop open/close circuit 32. The trunk circuit 30 has also the terminating circuit 25 of a local line, the 2-to-4 wire converter 26, the coder 27 and the decoder 28 in the same manner as each of the line circuits 22. The PBX 21 can be connected with analog telephones, digital telephones and domestic electric equipments controlled by the digital telephone. The controller 33 controls the line circuits 22, the exchange network 29 and the trunk circuit 30.

In the conventional telephone exchanging system shown in FIG. 2, when a first cordless phone calls a second cordless phone, the PBX 21 forms a channel between the base station 1 of the first cordless phone and the base station 1' of the second cordless phone. As a result, an extension communication between the first and second cordless phones can be carried out via the PBX 21.

In the PBX 21, the battery feed and ringing circuit 24 must supply a voltage of 48v to the 2W-subscriber line so that a loop current in a rage of 10–30 mA is supplied to the 2-W subscriber line. Under this condition of the PBX 21, each of the cordless phones can be normally operated. This condition is the same as that to be satisfied in an exchange provided in a public communication network. The PBX satisfying the above condition is expensive, so that it is difficult to introduce the PBX to a system used for small offices and homes.

Due to decreasing the voltage supplied to the 2W-subscriber line and to limitation of the current supplied to the 2W-subscriber line, the cost of the PBX can decrease. Such PBX is often referred to as a simplified switching unit. However, in the system provided with the simplified switching unit, electrical characteristics thereof are sacrificed for the cost. In addition, a degree of decreasing of the cost is small.

SUMMARY OF THE INVENTION

Accordingly, a general object of the present invention is to provide a cordless phone and a cordless phone system in which the disadvantages of the aforementioned prior art are eliminated.

A more specific object of the present invention is to provide a cordless phone capable of easily performing an extension communication with other cordless phones and remote control of domestic electric equipments.

The above objects of the present invention are achieved by a cordless phone comprising a base station coupled to a line and a personal station communicating with the base station by radio, the base station comprising: first channel means for operatively coupling the personal station to the line so that communication between the personal station and an external station is carried out via the line and the base station; second channel means for operatively coupling the personal station to a digital high-way through which digital data is transmitted so that extension communication between the personal station and a station connected to the digital high-way is carried out via the digital high-way and the base station; and control means, coupled to the line, the personal station and the digital high-way, for activating either of the first and second channel means based on control information supplied from the line, the personal station or the digital high-way.

Another object of the present invention is to provide a cordless phone system, having a simple constitution, in which an extension communication between cordless phones and remote control of domestic electric equipments can be performed.

The above objects of the present invention are achieved by a cordless phone system comprising: a digital high-way through which digital data is transmitted; high-way control means, coupled to the digital high-way, for performing a time sharing control of digital data transmitted through the digital high-way; and a plurality of cordless phones, each cordless phone comprising a base station coupled to a line and a personal station communicating with the base station by radio, the base station comprising: first channel means for operatively coupling the personal station to the line so that communication between the personal station and an external station is carried out via the line and the base station; second channel means for operatively coupling the personal station to the digital high-way so that extension communication between the personal station and a cordless phone connected to the digital high-way is carried out via the digital high-way and the base station; and control means, coupled to the line, the personal station and the digital high-way, for activating either of the first and second channel means based on control information supplied from the line, the personal station or the digital high-way.

According to the present invention, communication between the cordless phone and the external station can be performed via the first channel means of the base station and the line, and extension communication between the cordless phones can be performed via the second channel means of the base station and the digital high-way.

Additional objects, features and advantages of the present invention will become apparent from the following detailed description when read in conjunction with the accompanying drawings.

DESCRIPTION OF PREFERRED EMBODIMENTS

A description will now be given of the principle of a cordless phone according to an embodiment of the present invention with reference to FIG. 3.

Figure 3:
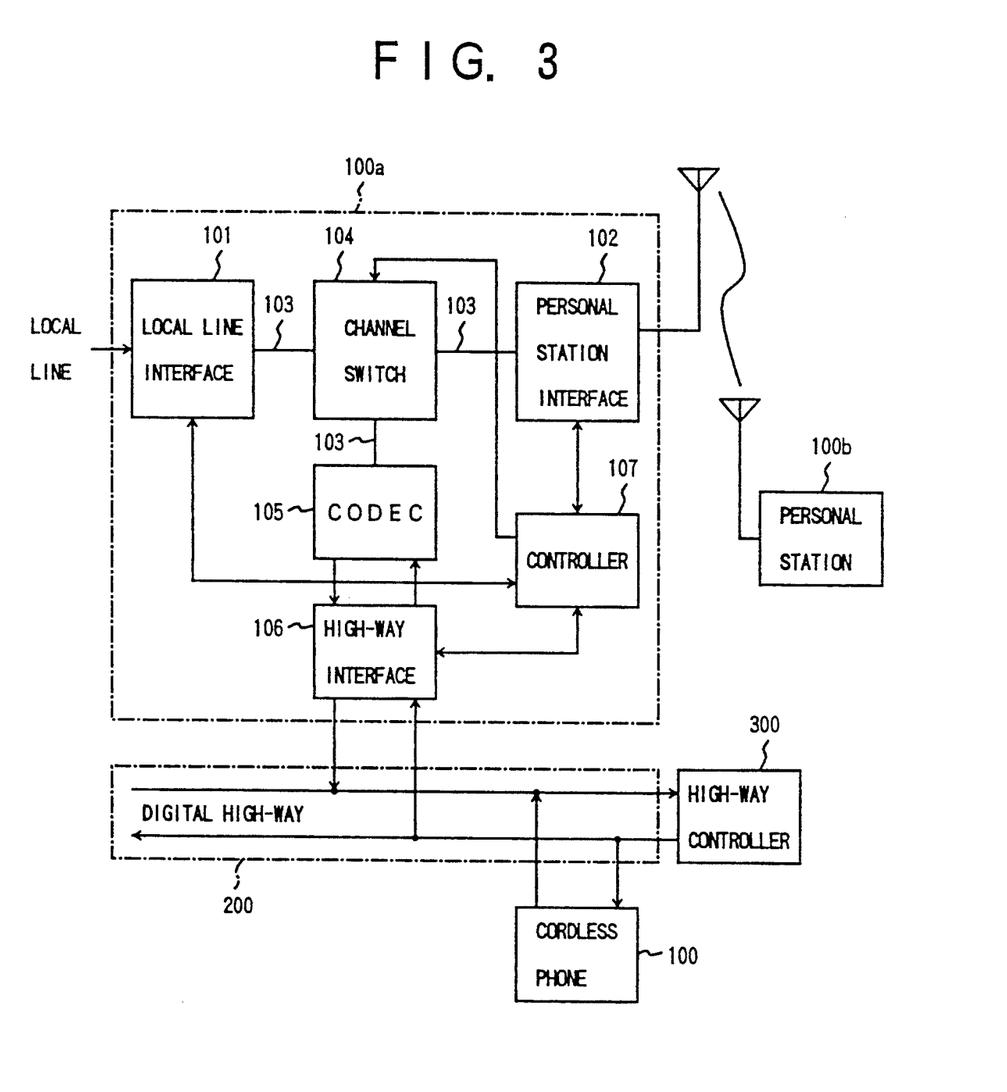
FIG. 3 is a block diagram illustrating an essential part of a cordless phone according to an embodiment of the present invention.

Referring to FIG. 3, a cordless phone is made of a base station 100a and a personal station 100b. Radio communication between the base station 100a and the personal station 100b is performed. The base station 100a has a local line interface 101 connected with a local line, a personal station interface 102 coupled by radio to the personal station 100b, a channel switch 104 provided in an analog channel 103 between the local line interface 101 and the personal station interface 102, a codec 105 coupled to the analog channel 103 via the channel switch 104, a high-way interface 106 connecting the codec 105 to a digital high-way 200 provided outside of the base station 100a, and a controller 107 controlling the local line interface 101, the personal station interface 102, the high-way interface 106. The controller 107 also controls the channel switch 104 in accordance with control information such as call-in information and call-out information supplied from the local line interface 101 and the personal station interface 102.

The digital high-way 200 is connected with another cordless phone 100 and a high-way controller 300. The high-way controller 300 carries out a time sharing control of the digital high-way 200 so that data supplied from a plurality of cordless phones to the digital high-way 200 is multiplexed.

When the controller 107 controls the channel switch 104 so that a channel between the local line interface 101 and the personal station interface 102 is opened, the cordless phone can call other stations via the local line (the outside line). When the controller 107 controls the channel switch 104 so that a channel between the personal terminal interface 102 and the codec 105 is opened, voice signals supplied from the personal station 100b are converted into digital voice data by the codec 105. Then the digital voice data output from the codec 105 is supplied to the digital high-way 200 via the high-way interface 106. The other cordless phone 100 receives the voice data from the digital high-way 200 at time slots shared thereby. As a result, an extension communication between cordless phones can be performed via the digital high-way 200.

A description will now be given of an embodiment of the present invention.

Figure 4:
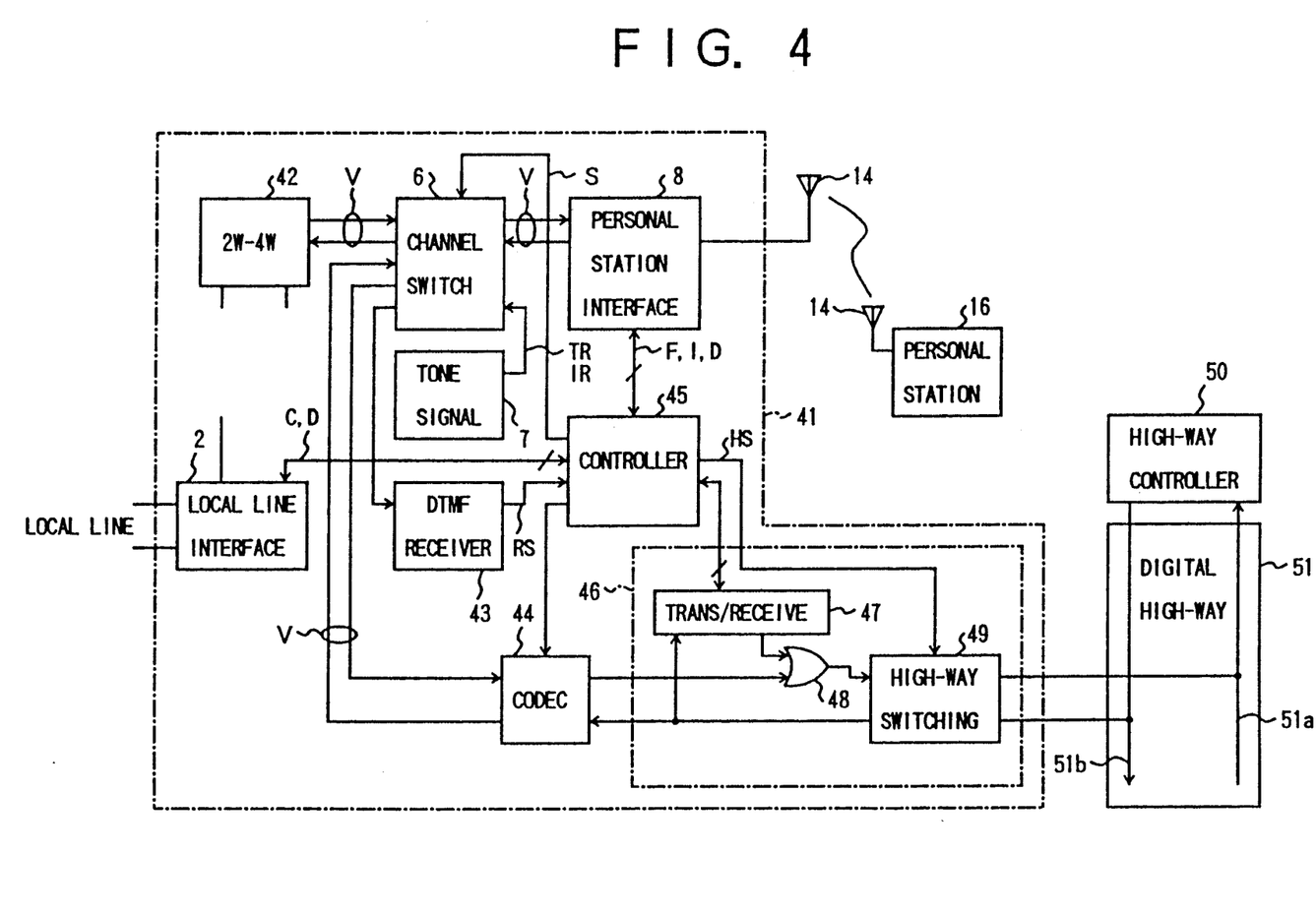
FIG. 4 is a block diagram illustrating a cordless phone according to an embodiment of the present invention.

FIG. 4 shows a cordless phone according to the embodiment of the present invention. In FIG. 4, those parts which are the same as those shown in FIG. 1 are given the same reference numbers. Referring to FIG. 4, a cordless phone is made of a base station 41 and the personal station 16. Radio communication between the base station 41 and the personal station 16 can be performed. The base station 41 has the local line interface 2 connected to the local line, the channel switch 6, the tone signal source 7 generating ringing tone signals (TR and IR) for the outside line and the extension, the personal station interface 8 provided with the antenna 14. In the base station 41, a 2W-to-4W converter 41 is coupled to the local line interface 2 via a transformer. The 2W-to-4W converter 41 is connected to the channel switch 6. Further, the channel switch 6 is connected with a DTMF (Dual Tone Multiple Frequency) receiver 43 and a codec 44. The DTMF receiver 43 converts analog remote control signals into digital remote control signals (RS). The codec 44 converts analog voice signals into digital voice signals and vice versa in either a PCM mode or ADPCM mode. A high-way interface 46 is provided between the codec 44 and a digital high-way 51. A controller 45 controls operations carried out in the base station 41. The high-way interface 46 is formed of a data transmitter/receiver 47, an OR gate 48 and a high-way switching circuit 49. The digital high-way 51 is constituted of an upward high-way 51a and a downward high-way 51b. The high-way switching circuit 49 switches a high-way to be connected to the high-way interface 46 from the upward high-way 51a to the downward high-way 51b and vice versa. Digital voice data output from the codec 44 is supplied to the digital high-way 51 via the OR gate 48 and the high-way switching circuit 49. Various control signals output from the controller 45 are supplied to the digital high-way 51 via the data transmitter/receiver 47, the OR gate 48 and the high-way switching circuit 49. Data in the digital high-way 51 can be input to the codec 44 via the high-way switching circuit 49. Data can be supplied from the digital high-way 51 to the controller 45 via the high-way switching circuit 49 and the data transmitter/receiver 47. The digital high-way 51 is connected to a high-way controller 50, the high-way controller 50 carries out a time sharing control of the digital high-way 51 so that data supplied from a plurality of cordless phones to the digital high-way 51 is multiplexed.

Figure 5:
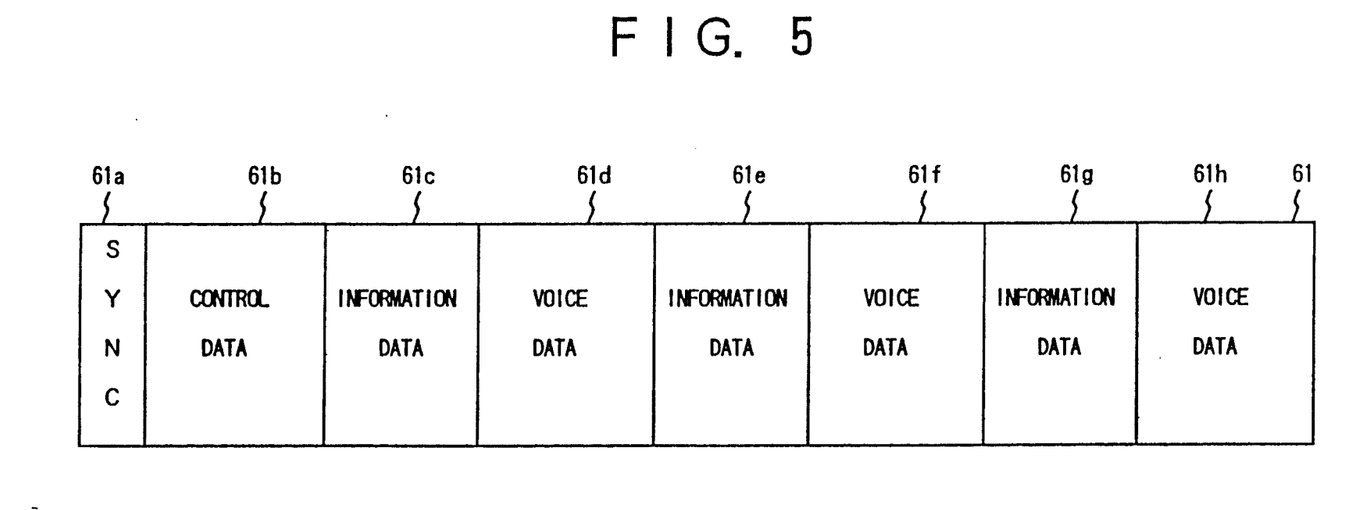
FIG. 5 is a diagram illustrating frame format of data transmitted through a digital high-way shown in FIG. 4.

A frame format of data transmitted in the digital high-way 51 is shown in FIG. 5. Referring to FIG. 5, a transmission frame 61 includes a synchronous data (SYNC) used for a synchronous operation of the transmission frame 61 and a control time slot 61b for various control data. After the control time slot 61b, times slots 61c, 61e and 61g for information data and times slots 61d, 61f and 61h for digital voice data are alternately arranged. Each pair of time slots (61c and 61d) (61e and 61f) and (61g and 61h) for the information data and the digital voice data is shared by one of the cordless phones.

Figure 6:
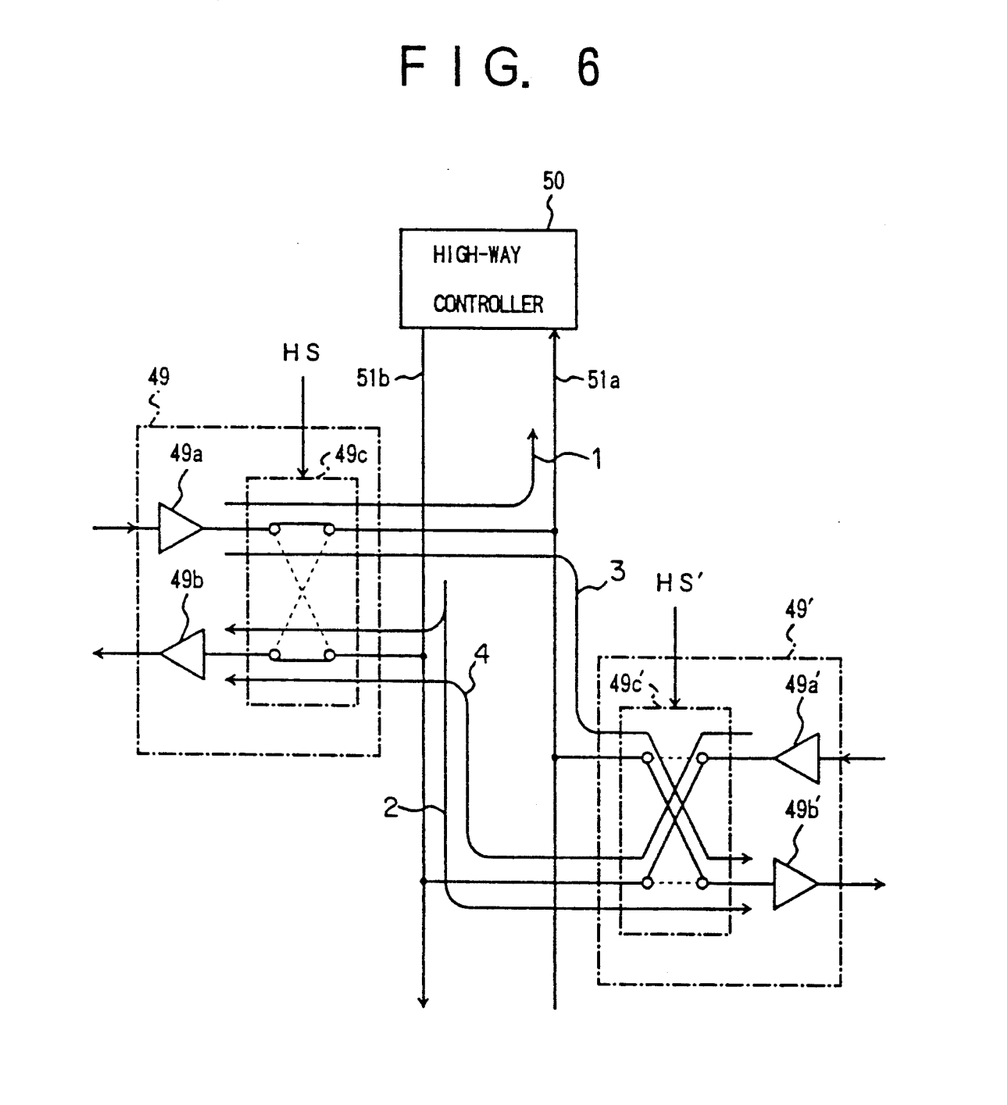
FIG. 6 is a detailed diagram illustrating a high-way switching circuit shown in FIG. 4.

The high-way switching circuit 49 (49') is formed as shown, for example, in FIG. 6. Referring to FIG. 6, the high-way switching circuit 49 (49') has a high-way driver 49a (49a') a high-way receiver 49b (49b') and a switching unit 49c (49c'). The switching unit 49c (49c') is driven based on a control signal HS (HS') supplied from the controller 45 so that the high-way driver 49a (49a') and the high-way receiver 49b (49b') are respectively connected to the upward high-way 51a and the downward highway 51b and vice versa.

Figure 7A:
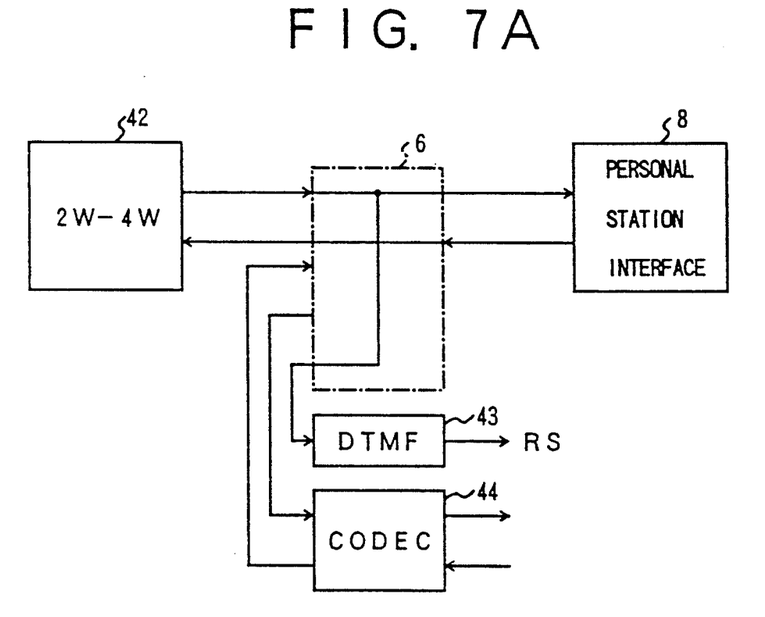
FIGS. 7A, 7B, 8A and 8B are block diagrams illustrating operations of a channel switch shown in FIG. 4.

Under a condition in which the channel switch 6 forms a channel between the local line interface 2 and the personal station interface 8 as shown in FIG. 7A, the cordless phone calls another station via the local line. Voice signals (analog signals) are transmitted by radio from the personal station 16 to the personal station interface 8. The voice signals are supplied to the local line via the channel switch 6, the 2W-to-4W converter 42 and the local line interface 2. Voice signals transmitted through the local line are received by the local line interface 2. The received voice signals are supplied to the personal station interface 8 via the 2W-to-4W converter 42 and the channel switch 6, and transmitted from the personal station interface 8 to the personal station 16 by radio. That is, a communication between the cordless phone and the other station is carried out via the local line.

Figure 7B:
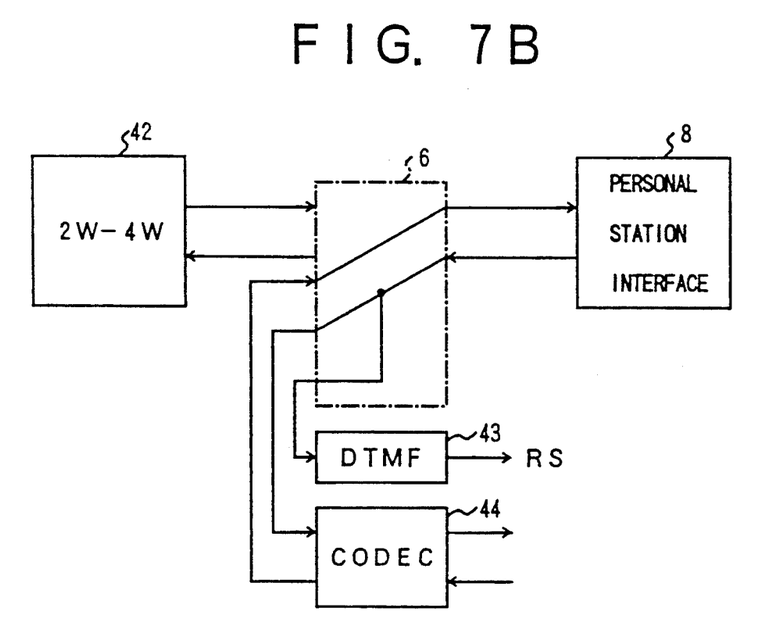

Under a condition in which the channel switch 6 forms a channel between the personal station interface 8 and the codec 44 as shown in FIG. 7B, an extension communication between a first cordless phone (having the base station 41) and a second cordless phone (having the base station 41') is carried out. In this case, the personal station interface 8 is coupled to the high-way interface 46 via the codec 44. When an off-hook operation of the personal station 16 occurs, an operation of an extension button and an input operation for inputting an extension number identifying the second cordless phone connected to the digital high-way 51 are successively carried out in the first cordless phone, a off-hook signal F, a signal I indicating an extension call operation and an extension number signal D indicating the extension number are transmitted from the personal station 16 to the personal station interface 8 of the base station 41 by radio. The off-hook signal F, the signal I and the extension number signal D are supplied from the personal station interface 8 to the controller 45. The data D, I and F are then supplied from the controller 45 to the upward high-way 51a via the data transmitter/receiver 47, the OR gate 48 and the high-way switching circuit 49. In this case, the data D, I and F pass through a path 1 as shown in FIG. 6 and are supplied to the upward high-way 51a at the control time slot 61b.

The high-way controller 50 receives the data D, I and F from the upward high-way 51a at the control time slot 61b, the high-way controller 50 recognizes that an extension call is to be supplied from the first cordless phone (41) to the second cordless phone (41'). The high-way controller 50 outputs time sharing information indicating, to the downward high-way 51b, that the first and second cordless phones share a pair of the time slots 61c and 61d for information data and voice data. The time sharing information passes through a path 2 as shown in FIG. 6 and is supplied from the downward high-way 51b to the base station 41 and 41' of both the first and second cordless phones. At this time, the second cordless phone called by the first cordless phone receives control data for switching the high-way switching circuit 49'. The controller 45' of the base station 41' supplies a control signal HS' corresponding to the received control data to the high-way switching circuit 49'. Due to the control signal HS', the high-way switching circuit 49' switches a connecting state shown by dashed lines in FIG. 6 to a connecting state shown by continuous lines in FIG. 6, so that the high-way driver 49a' and the high-way receiver 49b' are respectively connected to the downward high-way 51b and the upward high-way 51a. After that, the personal station interface 8' of the second cordless phone calls the personal station 16' by radio. When an off-hook operation of the personal station 16' of the second cordless phone is carried out by an operator, an extension channel is formed between the personal stations 16 and 16' of the first and second cordless phone. Voice signals received by the personal station interface 8 are supplied to the codec 44 and converted into digital voice data by the codec 44. The voice data generated in the codec 44 of the first cordless phone is supplied to the second cordless phone via a path 3 including the upward high-way 51a as shown in FIG. 6. Voice data generated by the codec 44' of the second cordless phone is supplied to the first cordless phone via a path 4 including the downward high-way 51b as shown in in FIG. 6. That is, an extension communication between the first and second cordless phones is carried out via the digital high-way 51.

Figure 8A:
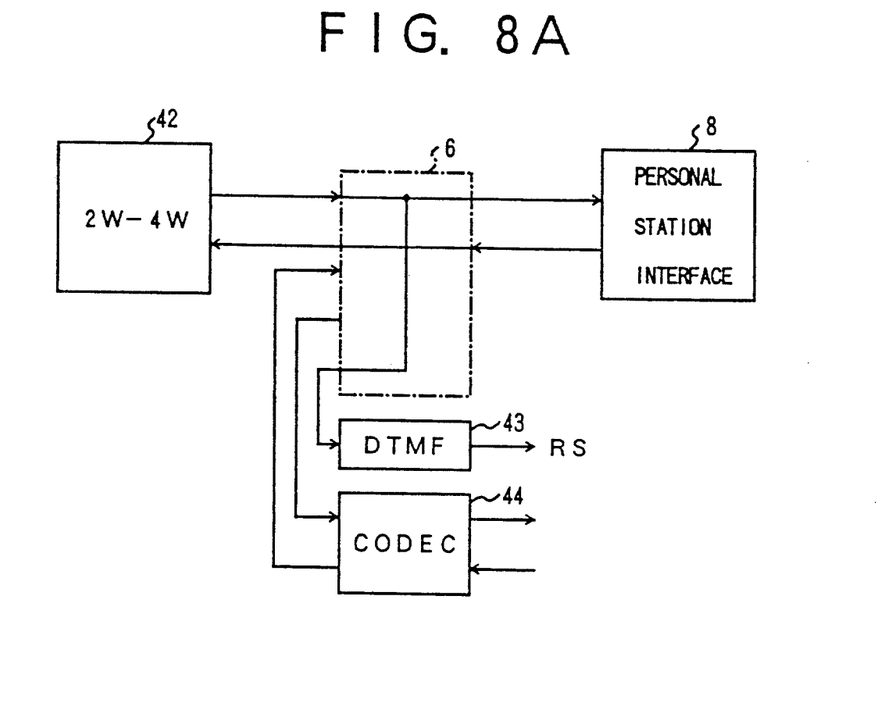
Figure 8B:
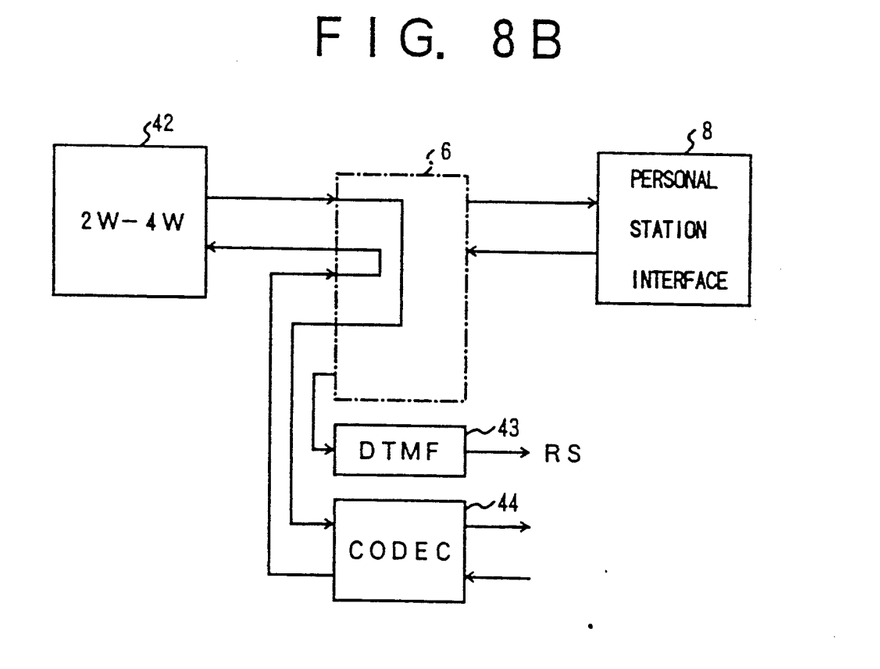

The base station 41 of the first cordless phone can transfer a call from an external station to the second cordless phone. In this case, under a condition in which the channel switch 6 of the first cordless phone forms a channel between the personal station interface 8 and the local line interface 2 as shown in FIG. 8A, the first cordless phone is called by the external station via the local line. A state where the first cordless phone is on hold is maintained, and an extension call is supplied from the first cordless phone to the second cordless phone in the same manner as that described above. At this time, the channel switch 6 in each of the first and second cordless phones form a channel as shown in FIG. 8B. After this, when an on-hook operation of the personal station 16 of the first cordless phone is carried out, the channel switch 6 of the first cordless phone forms a channel between the local line interface 2 and the high-way interface 46 as shown in FIG. 8B. In this state, a communication between the external station and the second cordless phone can be performed via the local line, the base station 41 of the first cordless phone and the digital high-way 51.

Before a communication between a calling station and called station starts, the DTMF receiver 43 is connected to a transmission line of the calling station for a predetermined period, as shown in FIGS. 7A, 7B and 8A. Thus, during the predetermined period, analog control signals can be supplied from the personal station 16 or the local line to the DTMF receiver 43. The DTMF receiver 43 converts the analog remote control signals to digital remote control data and supplies it to the controller 45. The controller 45 supplies the digital remote control data to the digital high-way 51 via the high-way interface 46 at unused time slots. The remote control data is supplied to domestic electric equipments via the digital high-way, so that the domestic electric equipments are controlled in accordance with the remote control data supplied thereto.

In a case where remote control signals are supplied from the personal station 16 to the base station 41, the remote control signal can be also supplied from the personal station interface 8 to the controller 45.

Figure 9:
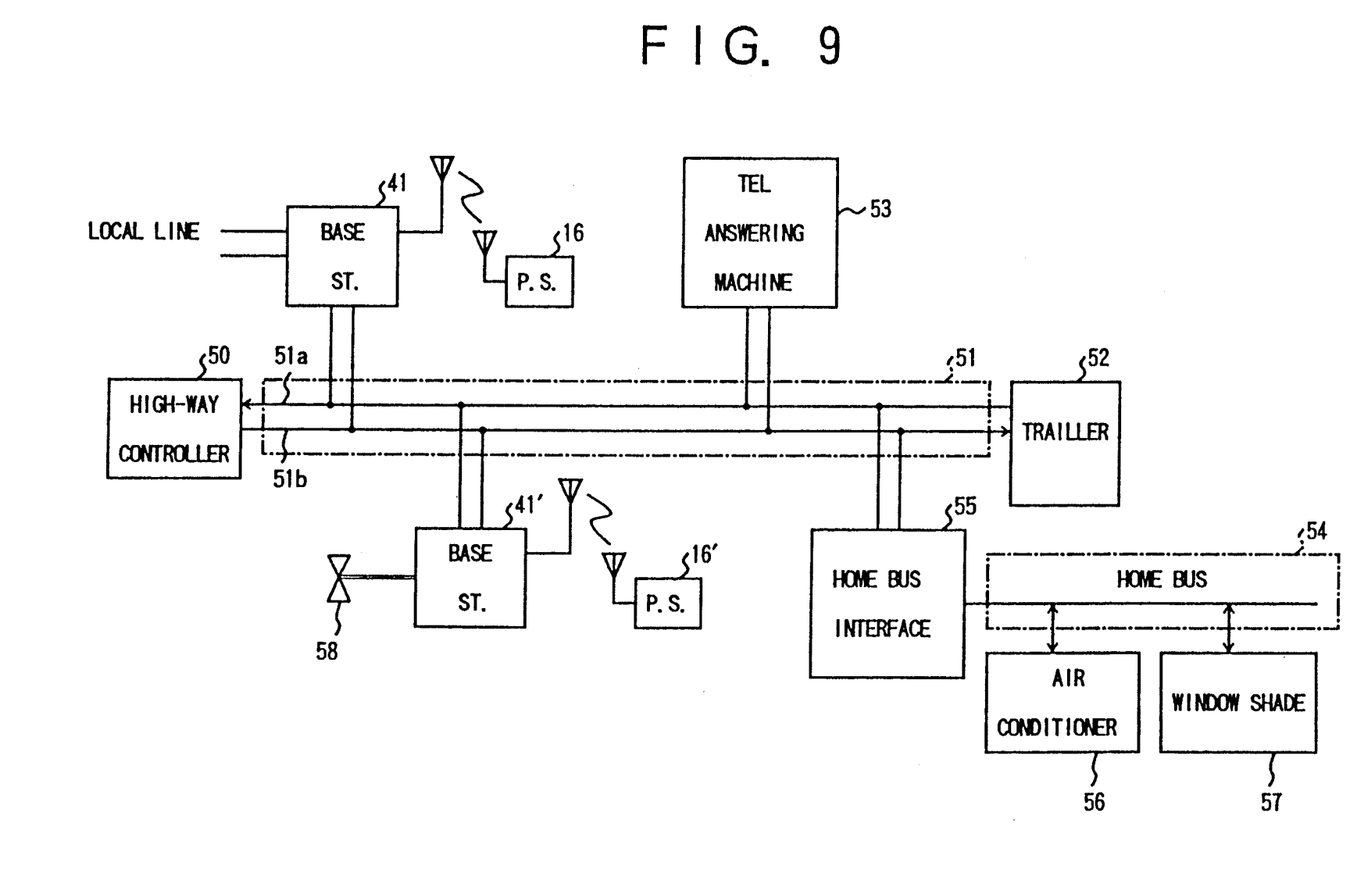
FIG. 9 is a block diagram illustrating a cordless phone system according to an embodiment of the present invention.

FIG. 9 shows a cordless phone system according to an embodiment of the present invention.

Referring to FIG. 9, the cordless phone system is provided with the digital high-way 51. First and second ends of the digital high-way 51 are respectively connected to the high-way controller 50 and a terminating circuit 52. The first cordless phone is constituted of the base station 41 and the personal station 16. The base station 41 accommodates the local line and is coupled to the digital high-way 51. The second cordless phone is constituted of the base station 41' and the personal station 16'. The base station 41' is coupled to the digital high-way 51. An analog telephone set is connected to the base station 41' of the second cordless phone. A telephone answering machine 53 capable of being remotely controlled is connected to the digital high-way 51. A home bus 54 is coupled to the digital high-way by a home bus interface 55. An air conditioner 56 and a window shade 57 which are capable of being remote controlled are connected to the home bus 54.

Control data supplied from each of the first and second cordless phones is supplied to the air conditioner 56 and the window shade 57 via digital high-way 51 and the home bus interface 55 and the home bus 54. As a result, the air conditioner 56 and the window shade 57 are controlled in accordance with the control data supplied thereto.

In the above embodiment, the digital high-way 51 is separated from the cordless phones. The present invention is not limited to this constitution, the digital high-way 51 can be also provided in one of the cordless phone. The cordless phone in which the digital high-way is provided is referred to as a main cordless phone.

The present invention is not limited to the aforementioned embodiments, and variations and modifications may be made without departing from the invention is not limited to the scope of the claimed invention.

What is claimed is:

1. A cordless phone in combination with a digital highway, the cordless phone comprising a base station coupled to a line connected to an external station, and a personal station communicating with said base station by radio, said digital highway being connected to at least one communication equipment, said base station of the cordless phone comprising:

- first channel means for operatively coupling said personal station to the line so that communication between said personal station and the external station is carried out via the line and said base station;
- second channel means for operatively coupling said personal station to the digital highway through which digital data is transmitted so that extension communication between said personal station and said at least one communication equipment connected to said digital highway is carried out only via said digital highway and said base station; and
- control means, coupled to the line, said personal station and the digital highway, for activating either of said first and second channel means based on control information supplied from the line, said personal station or the digital highway.

2. A cordless phone as claimed in claim 1, wherein said first channel means includes a first interface coupled to said personal station, a second interface coupled to the line, and a first channel provided between said first interface and the second interface, wherein analog signals are transmitted from said personal station to the line and vice versa via said first and second interface and said first channel.

3. A cordless phone as claimed in claim 2, wherein said second channel means shares said first interface, and wherein said second channel means includes a third interface coupled to the digital highway, signal conversion means provided between said first interface and said third interface, and a second channel provided between said first interface and said signal conversion means, said signal conversion means converting signals supplied from said first interface into digital data and supplying it to said third interface, and said signal conversion means converting digital data supplied from said third interface into analog signals and supplying it to said first interface, so that the digital data supplied from said signal conversion means to said third interface is transmitted to the digital highway and the analog signals supplied from said signal conversion means to said first interface via the second channel are transmitted to said personal station.

4. A cordless phone as claimed in claim 3, wherein aid signal conversion means includes a codec converting voice signals into digital voice data and vice versa, and means for converting control signals supplied from said first interface into control data and supplying the control data to said third interface.

5. A cordless phone as claimed in claim 3, wherein said control means includes switching means for switching from the first channel to the second channel and vice versa.

6. A cordless phone in combination with a digital highway, the cordless phone comprising a base station coupled to a line connected to an external station, and a personal station communicating with said base station by radio, said digital highway being connected to at least one communication equipment, said base station of the cordless phone comprising:

- first channel means for operatively coupling said personal station to the line so that communication between said personal station and the external station is carried out via the line and said base station;
- second channel means for operatively coupling said personal station to the digital highway through which digital data is transmitted so that extension communication between said personal station and said at least one communication equipment connected to said digital highway is carried out via said digital highway and said base station;
- third channel means for operatively coupling the line to the digital highway so that communication between said external station and said at least one communication equipment connected to said digital highway is carried out via the line, said base station and said digital highway; and
- control means, coupled to the line, said personal station and the digital highway, for activating one of said first, second and third channel means based on control information supplied from a line, said personal station or the digital highway.

7. A cordless phone as claimed in claim 6, wherein said first channel means includes a first interface coupled to said personal station, a second interface coupled to the line, and a first channel provided between said first and second interfaces, wherein analog signals are transmitted from said personal station to the line and vice versa via said first and second interfaces and said first channel.

8. A cordless phone as claimed in claim 7, wherein said second channel means shares said first interface with said first channel means, and wherein said second channel means includes a third interface coupled to the digital highway, signal conversion means provided between said first interface, and said third interface and a second channel provided between said first interface and said signal conversion means, said signal conversion means converting signals supplied from said first interface into digital data and supplying the digital data to said third interface, and said signal conversion means converting digital data supplied from said third interface into analog signals and supplying to said first interface, so that the digital data supplied from said signal conversion means to said third interface is transmitted to the digital highway and the analog signals supplied from said signal conversion means to said first interface via the second channel are transmitted to said personal station.

9. A cordless phone as claimed in claim 8, wherein said third channel means shares said third interface and said signal conversion means with said second channel means, and wherein said third channel means includes a third channel provided between the line and said signal conversion means, so that analog signals are supplied from the line to said signal conversion means and vice versa via the third channel.

10. A cordless phone as claimed in claim 8, wherein said signal conversion means includes a codec converting voice signals into digital voice data and vice versa, and means for converting control signals supplied from said first interface into control data and supplying the control data to said third interface.

11. A cordless phone as claimed in claim 9, wherein said control means includes switching means for selecting one of the first, second and third channels.

12. A cordless phone system comprising:
- a digital highway through which digital data is transmitted;
- highway control means, coupled to said digital highway, for performing a time sharing control of digital data transmitted through said digital highway; and a plurality of cordless phones, each cordless phone comprising a base station coupled to a line connected to an external station, and a personal station communicating with said base station by radio, said base station comprising:

first channel means for operatively coupling said personal station to the line so that communication between said personal station and the external station is carried out via the line and said base station;

second channel means for operatively coupling said personal station to said digital highway so that extension communication between said personal station and a cordless phone connected to said digital highway is carried out only via said digital highway and said base station; and control means, coupled to the line, said personal station and the digital highway, for activating either of said first and second channel means based on control information supplied from the line, said personal station or the digital highway.

13. A cordless phone system as claimed in claim 12, wherein said first channel means includes a first interface coupled to said personal station, a second interface coupled to the line and a first channel provided between said first interface and said second interface, wherein analog signals are transmitted from said personal station to the line and vice versa via said first and second interfaces and said first channel.

14. A cordless phone system as claimed in claim 13, wherein said second channel mean shares said first interface with said first channel means, and wherein said second channel means includes a third interface coupled to the digital highway, signal conversion means provided between said first interface and said third interface, and a second channel provided between said first interface and said signal conversion means, said signal conversion means converting signals supplied from said first interface into digital data and supplying the digital data to said third interface, and said signal conversion means converting digital data supplied from said third interface into analog signals and supplying the analog signals to said first interface, so that the digital data supplied from said signal conversion means to said third interface is transmitted to the digital highway and the analog signal supplied from said signal conversion means to said first interface via the second channel are transmitted to said personal station.

15. A cordless phone system as claimed in claim 14, wherein said digital highway includes a first highway and a second highway, and wherein said third interface comprises:

a transmitter for transmitting digital data to said digital highway;

a receiver for receiving digital data from said digital highway; and switching means for switching connections between said third interface and said digital highway from a first state in which said transmitter and said receiver are respectively connected to said first and second highways, to a second state in which said transmitter and receiver are respectively connected to said second and first highways and vice versa.

16. A cordless phone system as claimed in claim 12, further comprising:

an internal system including at least one electric equipment, said internal system being connected to said digital highway, so that said electric equipment is controlled by signals supplied from said personal station to said internal system via said second channel means of said base station and said digital highway.

17. A cordless phone system as claimed in claim 16, wherein said second channel means includes signal conversion means for converting analog control signals supplied from said personal station into digital control data and for supplying the digital control data to said digital highway, the digital control data being transmitted to said internal system via said digital highway so that said electric equipment of said internal system is controlled by digital control signals.

* * * * *